Sept. 21, 1937. J. PETTI 2,093,527
SOLDERING TOOL
Filed Aug. 19, 1936 2 Sheets-Sheet 1
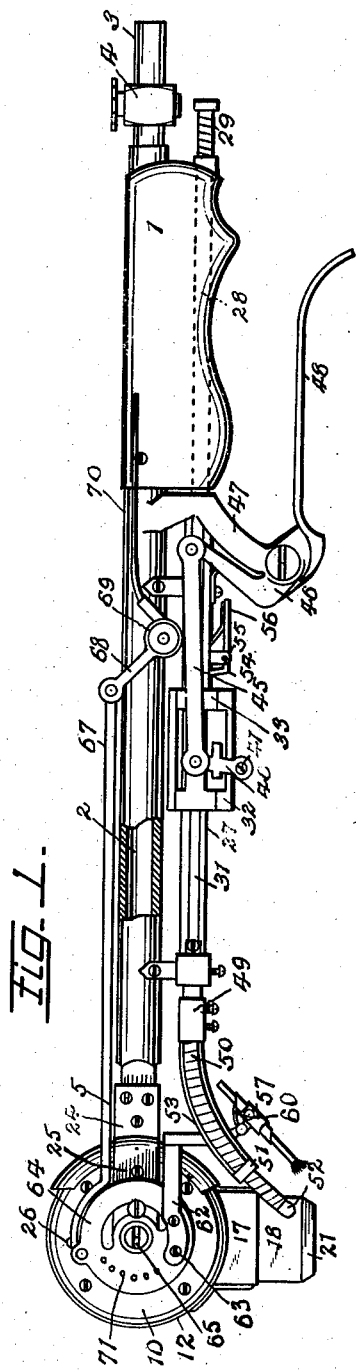
Inventor
Joseph Petti

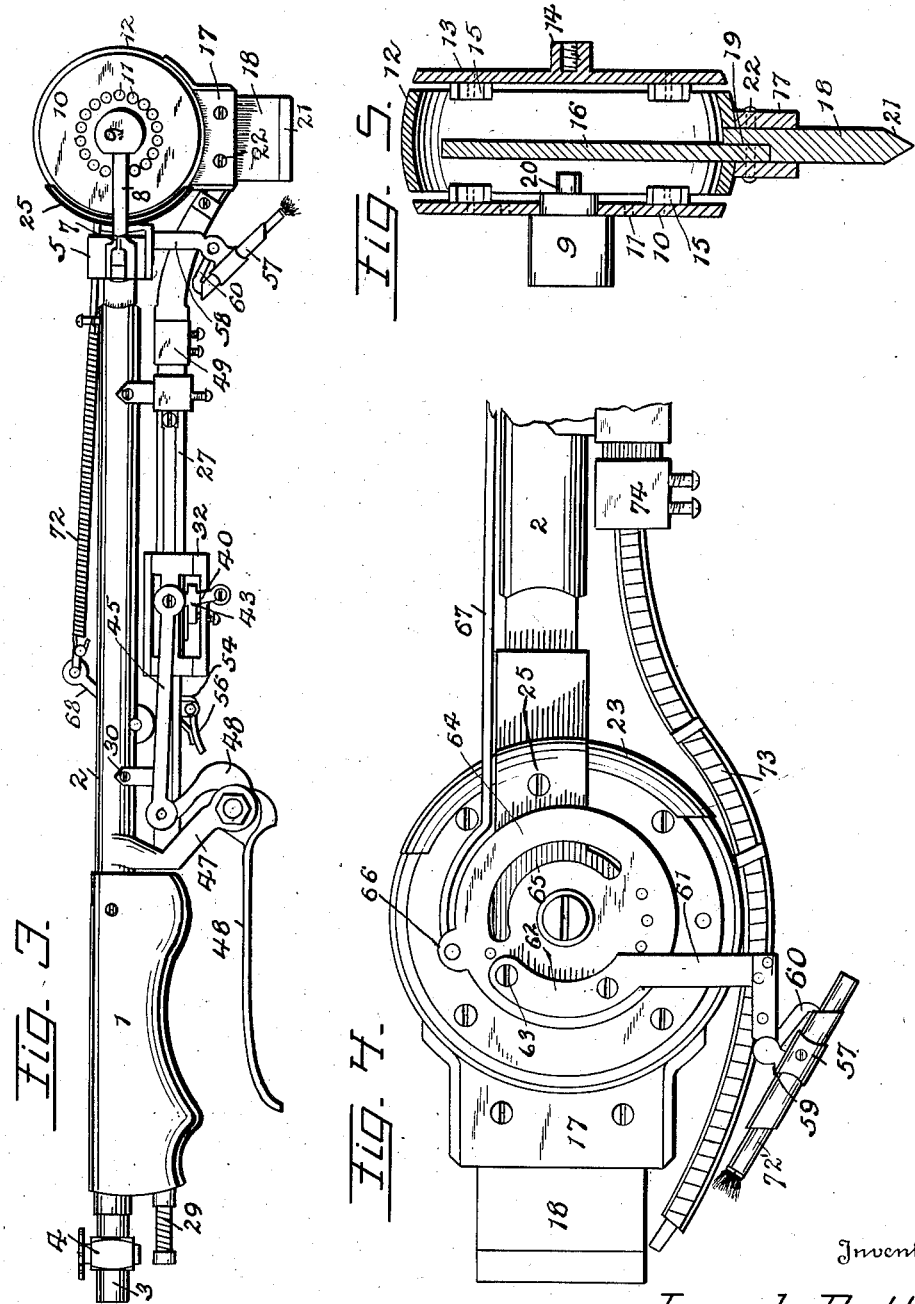

Patented Sept. 21, 1937

2,093,527

UNITED STATES PATENT OFFICE 2,093,527

SOLDERING TOOL

Joseph Petti, Brooklyn, N. Y.

Application August 19, 1936, Serial No. 96,900

7 Claims. (Cl. 113—109)

This invention is directed to an improvement in soldering tools and more particularly to an implement of this class designed to be held in one hand of the operator and manipulated for the application of the soldering iron and for the delivery of the solder strip and the application of flux to the solder line through the fingers of that hand.

In hand soldering implements of this character it is important that the implement be capable of complete manipulation by the fingers of the hand in which it is held in order to leave the other hand of the operator completely free for manipulating and holding the parts to be soldered and in this connection, the feeding of the solder strip to the heated iron must be capable of being accomplished at the speed and in the amount required for the particular job, and such an implement to be practically complete must provide means whereby an appropriate flux may be applied to the seam or joint being soldered at will and immediately in advance of the soldering movement of the iron.

Therefore, the primary object of the present invention is the provision of a soldering implement capable of being held in one hand of the user and provided with lever-controlled means whereby the solder strip may be advanced at will and further lever-controlled means whereby a flux may be applied at will to the joint being soldered, the levers being mounted and arranged to be conveniently manipulated by the fingers of the hand holding and directing the implement.

In hand implements of this type, no provision is ordinarily made for changing the direction of the iron proper with respect to the implement and such heretofore proposed implements are thus difficult to handle in some situations.

Therefore, a further object of the invention is the provision of means whereby the iron proper may be adjusted to operate in a position at right angles to the implement or in line therewith, thereby adapting the implement for convenient soldering of joints or seams in practically any relation or position, through such adjustment of the iron. The invention contemplates a corresponding adjustment of the solder strip directing element and of the flux applying member to accommodate themselves to either position of the iron, without in any way interfering with their usual hand manipulation.

A further object of the invention is the provision of an implement of this type designed to be heated by an inflammable gas which, as well known, results in a constant and uniform heating of the iron proper and insures the best results as a heating medium under all conditions.

The invention is illustrated in the accompanying drawings, in which:

Figure 1 is a side elevation of the improved soldering implement.

Figure 2 is a top plan view of the same.

Figure 3 is a side elevation of the implement viewed from the side opposite to that shown in Figure 1.

Figure 4 is an enlarged broken elevation showing the parts in their adjusted relation to arrange the iron proper at right angles to the position shown in Figures 1, 2 and 3.

Figure 5 is a vertical section through the heater.

Figure 6 is a longitudinal sectional view through the means for feeding the solder strip.

Figure 7 is a sectional view on the line 7—7 of Figure 6.

The improved structure comprises a hand grip portion 1, preferably of wood or a non-heat conducting material, and hereinafter referred to as the handle, being shaped for convenient gripping in one hand. A fuel, preferably gas, pipe or tube 2 extends through the handle, being provided beyond the handle in one direction with a nipple 3 and an adjacent controlling valve 4, the nipple 3 being designed to removably secure the end of a flexible conduit (not shown) leading from a source of gas supply.

The fuel pipe 2 extends beyond the handle 1 in a direction opposite the nipple extension for a length convenient for that of the implement and is closed at the forward end, being at such end provided with a hollow rectangular bracket 5 which supports a lateral tube 6 extending through the bracket and in communication with the fuel pipe 2, the tube 6 leading to and through a forward ejector nozzle 7 which directs the gas into an auxiliary tube 8 supported from the bracket 5 and opening into one end of a hollow trunnion 9 to the burner.

A plate 10 formed with openings 11 for air admission is mounted for rotation upon a reduced part of the trunnion 9 and secured to this plate is a circular burner casing 12. Beyond the burner casing relative to the plate 10 is provided a second plate 13 formed with a threaded outstanding axial nipple 14. The burner casing is provided with lugs 15 to which the plates 10 and 13 are removably secured, the plates being spaced from the edges of the burner casing to insure admission of air for combustion.

Within the burner casing is mounted the heating plate 16. A socket housing 17 extends radially from the circular burner casing 12 and receives the soldering iron proper, indicated at 18, and preferably of copper. The inner end of the iron proper is recessed at 19 to receive the edge of the burner plate 16 in order to insure the transfer of heat from the burner plate directly to the iron.

The trunnion 9 inwardly of the plate 10 has a gas outlet 20 terminating directly adjacent the burner plate, at which point the gas is ignited to appropriately heat the burner plate and transfer such heat to the iron 18. Beyond the socket 17, the iron 18, while here shown as of rectangular form with a V-shaped edge 21, may be of any desired form or with any appropriate edge formation as required for a particular use of the implement. The iron is secured to the socket 17 and to the burner plate by screws 22 which provide for convenient renewal or removal of the iron when necessary to renew or to substitute another form of iron. A heat shield 23 is supported in the bracket 5 and overlies the burner casing in a direction toward the handle 1.

It is to be particularly noted that the burner proper including the burner casing, the plates 10 and 13, the heating plate 16 and the iron 18 is rotatably supported upon the trunnion 9. This, as will later appear, permits the arrangement of the iron at right angles to the length of the implement, as illustrated in Figures 1, 2 and 3, or in alignment with the implement, as illustrated in Figure 4, as will later more particularly appear.

In order to secure the burner parts in fixed relation to the implement in any particular use, the bracket 5 is provided with a plate 24 which is extended forwardly and overlies the plate 13, being removably secured to said plate by a screw 25. The plate 13 is provided with a further screw-hole, indicated at 26 in Figure 1, in which the screw 25 may be engaged when the burner is swung to a position to dispose the iron in alignment with the implement, as indicated in Figure 4, whereby the iron proper is rigid with the implement in either position though conveniently adjustable from one position to the other through the removal and replacement of the screw 25.

Extending in parallelism with the fuel pipe 2 is a rectangular guideway for the strip of solder, which guideway, indicated at 27, extends through the handle 1 as a tube 28. At the rear end of the handle the tube 28 terminates in a flexible spring-like section 29 which may be subjected to intermittent pressure toward the handle in the initial feeding of the solder strip. In advance of the handle 1, the guideway 27, which is supported from the fuel pipe 2 at 30, is rectangular in section and for the main portion of its length is open at the top and bottom and at the sides, the openings being of less width than the similar portions of the guideway. The openings in the sides of the guideway are closed by spring strips 31 which form pressure strips for the solder strip being fed through the guideway, as will be evident.

Slidably supported upon the guideway is a strip feeding slide 32. This slide, illustrated more particularly in Figures 6 and 7, comprises end members 33 slidably embracing the guideway and connected by longitudinal strips 34 bearing against the side walls of the guideway. The end members 33 are connected by a plate 35 removably secured thereto and having a portion 36 depending in and guided by the upper opening in the guideway. The end members 33 are further connected by a bottom plate 37 having depending from its lower surface a transverse sleeve member 38.

A plate 39 extends transversely of the slide between the bottom plate 37 and the longitudinal strips 34. This plate is provided at the ends beyond the slide proper with depending ears 40 which, through the medium of screws 41, are swingingly supported in the sleeve member 38. The plate 39 also has upstanding ears 42 to be connected to an operating lever, as will later appear. The plate 39 is provided on its upper surface with a dog 43 having serrations 44 on its upper edge, the serrated section of the dog extending into the guideway between the springs 31 and acting to advance the solder strip, as will later appear.

The upper ends of the ears 42 are connected by links 45 with the upper end of a lever 46 pivotally supported in a bracket 47 depending from the fuel pipe 2 immediately in advance of the handle 1, the rear end of the lever being extended as a finger portion 48 immediately below the handle 1, so as to be conveniently operated by the fingers of the hand gripping the handle 1. The portion of the lever 46 in advance of the pivot is in spaced sections to avoid interference with the guideway.

The forward end of the guideway 27 terminates rearwardly of the burner and is shaped to removably secure a hollow rectangular support 49 to which is connected a flexible extension 50 which is appropriately curved, so that the exit end 51 terminates adjacent the iron 18, that is in a position to feed the strip solder, indicated at 52, into contact with the iron for melting incident to the soldering function. The flexible section 50 is maintained in the desired form by a metallic support 53 projecting from the bracket 49.

Immediately in rear of the normal position of the feed slide is arranged a dog 54 pivotally supported at 55 upon the guide and having an operative end projecting through the opening in the bottom of the guide and an outstanding spring-pressed finger portion 56 to control the dog. The dog operates to prevent possibility of rearward movement of the soldering strip during rearward movement of the feed slide and of course is moved out of the way during the initial positioning of the solder strip.

In connection with most soldering operations, it is necessary to deliver a flux at the point of solder application to insure proper fixing and hardening of the solder in the operation. For this purpose, the implement is provided with a flux applying element in the shape of a tubular sleeve 57 swingingly supported from an arm 58, the pivotal support having a spring 59 which normally holds the sleeve 57 against a stop 60 projecting from the arm 58, the sleeve, however, being freely movable in the opposite direction to provide for convenient introduction of the flux applying member. The arm 58 is connected at its upper end to a second arm 61 which extends toward and overlies the burner.

The arm 61 is terminally provided with an arcuate portion 62 to be removably secured by screws 63 to a plate 64 rotatably supported by a pivot bolt 65 threaded into the extension 14 of the plate 13 of the burner assembly. The plate 64 is thus freely rotatable with respect to the plate 13 and is provided with an outstanding ear 66 connected by an appropriate wire length 67 to an angle lever 68 pivotally supported at 69 to a projection depending from the fuel pipe and extended beyond the pivotal support in the form of a finger plate 70 which extends lengthwise and adjacent the upper forward portion of the handle 1 in a position to be conveniently depressed by the thumb of the hand gripping the handle.

The plate 64 is provided with a series of openings for convenient application of the end of the arm 61 when the position of the soldering iron is changed, as will later appear. A spring 72 is connected to the fuel pipe 2 at one end and to the wire length 67 adjacent the angle lever 68, this spring serving to maintain the parts in such position that the flux-applying sleeve is withdrawn from the soldering iron, as indicated in Figure 1 of the drawings. The sleeve 57 of the flux-applying element may, for example, receive a brush 72' to which flux has been applied.

With the parts in the position indicated in Figures 1 and 2, the iron 18 is at right angles to the length of the implement, and after a soldering strip has been fed through the guide and projected beyond the flexible terminal 50, the implement is ready for use. Gas is admitted through the fuel pipe and ignited in the burner to properly heat the plate 16 and thereby the iron 18. A flux-applying implement has been placed in the sleeve 57. In use, the handle 1 is grasped in the hand, the fingers underlying the lever extension 48 and the thumb overlying the finger-piece 70. The finger-piece 70 is manipulated by the thumb to move the flux-applying implement to the seam and the lever 48 is operated to move the slide forwardly and cause the dog 43, or more particularly the teeth of said dog, to correspondingly advance the solder strip. A spring may be arranged at the pivot of the lever 46 to return the slide for a fresh grip of the strip at each operation. The solder strip is thus brought into contact with the iron immediately above the seam-forming point and melted for proper soldering, the strip being advanced or additional flux applied whenever necessary or desirable in the particular operation.

If it is desired to use the implement with the iron in alignment with the implement, as necessary in some soldering operations, the screw 25 is removed as is also the screw 63 holding the arm 61 of the flux-applying element. The iron 18 and the burner are then moved bodily on the trunnion 9 as a pivot until the iron is arranged in alignment with the fuel pipe 2, as indicated in Figure 4. The screw 25 is then applied in the opening 26, again fixing the burner and connected parts to the implement and disposing the iron 18 in alignment with the fuel pipe 2. The screws 63 are then applied in the appropriate openings 71 so as to position the flux-applying detail in proper relation to the iron, that is in the spaced relation occupied when the iron is at right angles to the fuel pipe 2, so that the flux-applying sleeve is held in the new position of the iron in an appropriately spaced relation to the iron while, of course, being still responsive to the action of the finger-piece 71.

When the parts have been adjusted to arrange the iron 18 in alignment with the fuel pipe 2, an auxiliary flexible section is necessary to direct the solder strip in contact with the iron. Under these circumstances, the flexible section 50 is removed by disconnecting the bracket 49 from the end of the guideway 27 and a supplementary flexible guide section 73 is applied. This substitute section is identical with the previous section except in length and outline form, being provided with a bracket 74 which is removably secured to the terminal of the guideway 27 and the outline form being such as to direct the outlet end adjacent the now changed position of the iron for directing the solder strip into contact with the iron.

The implement as a whole is designed to provide in a single, easily handled and conveniently operated device a full and complete control of the soldering operation, providing that the fingers of one hand which grip and manipulate the implement may be utilized to feed the solder as desired or apply flux when necessary. Thus, the other hand of the operator is free for other service, for example for holding a cap in place to be soldered or in holding a separate part which is to be soldered in place. Furthermore, the implement permits the use of the iron either at right angles to the length of the implement or aligned therewith at will and this while still permitting, without material change, the full and complete control of the feeding of the solder and the application of the flux. The solder strip is more or less effectively gripped by the springs 31 and prevented from retrograde movement with the dog 54, thus insuring that in each forward movement of the slide, the strip will be correspondingly advanced, and as this feeding movement is optional, the strip may be advanced by degrees and at such speed as may be necessary in the particular operation.

What is claimed to be new is:

1. A soldering implement of the hand-carried type, including a fuel tube, a handle at one end of the tube, a burner at the opposite end of the tube, an iron carried by the burner, means for mounting the burner for rotation to permit the iron to be arranged at right angles to or in alignment with the fuel tube, a guide for a solder strip, and means operable from a position adjacent the handle to feed the solder strip through the guide, said guide including means to receive and support either of two flexible solder strip guiding sections, one of a length to terminate adjacent the iron when at right angles to the fuel tube and the other of a length to terminate adjacent the iron when in alignment with the fuel tube.

2. A soldering implement of the hand-carried type, including a fuel tube, a handle at one end of the tube, a burner at the opposite end of the tube, a combustion chamber carried by and rotatably mounted on the burner, an iron carried by the combustion chamber and heated by the burner, means for mounting the combustion chamber for rotation to permit the iron to be arranged in either one of two positions with respect to the handle, a solder strip guide fixed to the fuel tube and extending through and beyond the handle, means slidably mounted on the guide to engage the strip and advance the same through the guide, and means arranged adjacent the handle for operating the strip advancing means.

3. A soldering implement of the hand-carried type, including a fuel tube, a handle at one end of the tube, a burner at the opposite end of the tube, a soldering iron element carried by the burner, means for mounting the burner for rotation to permit the iron to be arranged in either one of two positions with respect to the fuel tube, manually operable means supported by the fuel tube for feeding a solder strip into contact with the soldering iron, a flux-applying element mounted for swinging movement with respect to the burner, and means for operating the flux-applying element to deliver the flux adjacent the soldering line of the soldering iron, the means for operating the flux applying element being arranged for adjustable connection with said element to provide for operating the element in either position of the burner.

4. A soldering implement of the hand-carried type, including a fuel tube, a handle at one end of the tube, a burner at the opposite end of the tube, a soldering iron element carried by the burner, means for mounting the burner for rotation to permit the iron to be arranged in either one of two positions with respect to the fuel tube, manually operable means supported by the fuel tube for feeding a solder strip into contact with the soldering iron, a flux-applying element mounted for swinging movement with respect to the burner, and means for operating the flux-applying element to deliver the flux adjacent the soldering line of the soldering iron, said means being operable from a point adjacent the handle, the means for operating the flux applying element being arranged for adjustable connection with said element to provide for operating the element in either position of the burner.

5. A soldering implement of the hand-carried type, including a burner, a combustion chamber rotatably supported on the burner, a soldering iron carried by and movable with the combustion chamber and positioned to be heated by the burner, and a guide for directing a solder strip into contact with the iron, said guide including a longitudinal conduit, spring strips forming the side walls of the conduit, and a feeding strip slidable on the conduit and including a dog projecting through an opening in the conduit into a position to engage the solder strip within the conduit.

6. A soldering implement of the hand-carried type, including a fuel tube, a hand grip at one end of said tube, a burner mounted for rotation at the opposite end of the tube, means for directing fuel from the fuel tube to the burner, a soldering iron carried by the burner and heated by the burner, a solder strip guide supported from the fuel tube, means for feeding the solder strip lengthwise the guide, a flux-applying element, a plate mounted for rotation on and with respect to the burner, and means for connecting the flux-applying element in any one of several positions with respect to the plate, whereby the flux-applying element may normally occupy the same position with respect to the solder iron in any rotated position of the burner.

7. A soldering implement of the hand-carried type, including a fuel tube, a burner having an outlet directed laterally with respect to the fuel tube and in open communication with the tube, a combustion chamber mounted for rotation on and solely supported by the fuel outlet of the burner, an iron carried by the combustion chamber, said iron, through rotation of the combustion chamber, being capable of occupying a position at right angles to the fuel tube or a position in alignment therewith, and means carried by the fuel tube and designed to be removably connected to the combustion chamber to fix the combustion chamber and thereby the iron in either of its adjusted positions.

JOSEPH PETTI.